US011887421B1

(12) United States Patent
Else et al.

(10) Patent No.: US 11,887,421 B1
(45) Date of Patent: Jan. 30, 2024

(54) MULTI-LOCKING MECHANISMS FOR PREMISES SECURITY SYSTEMS

(71) Applicant: The ADT Security Corporation, Boca Raton, FL (US)

(72) Inventors: Steven Else, Deerfield Beach, FL (US); Jatin Patel, Boca Raton, FL (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

(21) Appl. No.: 18/459,730

(22) Filed: Sep. 1, 2023

Related U.S. Application Data

(63) Continuation of application No. 18/088,376, filed on Dec. 23, 2022, now Pat. No. 11,776,337.

(51) Int. Cl.
*G07C 9/00* (2020.01)
*G07C 9/38* (2020.01)
*G07C 9/37* (2020.01)

(52) U.S. Cl.
CPC ..... *G07C 9/00571* (2013.01); *G07C 9/00309* (2013.01); *G07C 9/37* (2020.01); *G07C 9/38* (2020.01); *G07C 2009/00769* (2013.01); *G07C 2209/04* (2013.01)

(58) Field of Classification Search
None
See application file for complete search history.

(56) References Cited

U.S. PATENT DOCUMENTS 5,256,989 A * 10/1993 Parker ..................... H03L 7/095 331/DIG. 2
6,035,676 A 3/2000 Hudspeth
8,248,106 B1 * 8/2012 Cohen ....................... H03L 7/16 327/156
9,262,875 B1 2/2016 Chen
9,342,936 B2 5/2016 Scalisi
10,294,702 B1 5/2019 Skiles
2007/0200666 A1 8/2007 Howard
2011/0316667 A1 12/2011 Tran
(Continued)

FOREIGN PATENT DOCUMENTS

CN 112802242 A 5/2021
KR 1020200045905 A 5/2020

OTHER PUBLICATIONS

Park, Yong Tae, Pranesh Sthapit, and Jae-Young Pyun. "Smart digital door lock for the home automation." TENCON 2009-2009 IEEE Region 10 Conference. IEEE, 2009. Consisting of p. 7.

*Primary Examiner* — Carlos Garcia
(74) *Attorney, Agent, or Firm* — Christopher & Weisberg, P.A.

(57) ABSTRACT

A primary lock device is provided which is configured to wirelessly communicate with a premises security system hub device and at least one secondary lock device in a premises security system. The primary lock device receives a lock configuration, receives a user input, authenticates the user input, and engages or disengages a locking mechanism based at least in part on the lock configuration and a result of authenticating the user input. The primary lock device determines a lock indication based at least in part on the lock configuration and a result of authenticating the user input, and transmits the lock indication to at least one secondary lock device for engaging or disengaging at least one respective lock mechanism of the at least one secondary lock device.

20 Claims, 6 Drawing Sheets

(56) References Cited

U.S. PATENT DOCUMENTS

| | | | |
|---|---|---|---|
| 2016/0035161 | A1 | 2/2016 | Friedli et al. |
| 2016/0217637 | A1 | 7/2016 | Gengler et al. |
| 2019/0103966 | A1 | 4/2019 | Zimny et al. |
| 2021/0168106 | A1 | 6/2021 | Kuenzi et al. |
| 2021/0366214 | A1 | 11/2021 | Gant et al. |

* cited by examiner

MULTI-LOCKING MECHANISMS FOR PREMISES SECURITY SYSTEMS

CROSS-REFERENCE TO RELATED PATENT APPLICATION

This application is a continuation of and claims priority to U.S. Utility patent application Ser. No. 18/088,376, filed on Dec. 23, 2022, entitled MULTI-LOCKING MECHANISMS FOR PREMISES SECURITY SYSTEMS, the entirety of which is incorporated herein by reference.

TECHNICAL FIELD

The present technology is generally related to premises security, and in particular to multi-locking mechanisms for premises security systems, including multiple lock devices affixed to one or more structures (e.g., doors, windows, etc.).

BACKGROUND

In some existing premises security systems, some entry doors into a facility may have multiple locks (e.g., a lever style lock and a deadbolt). Furthermore, various other structures in the premises (e.g., interior doors, windows, etc.) may have additional locks for controlling access to various areas (e.g., zones, rooms, etc.) within the premises. To install and control multiple locks in such an existing system using wireless technology (e.g., Bluetooth, Wi-Fi, Z-Wave, ZigBee, etc.), or with local code entry, one may need to install multiple separate door locks and operate them separately to open and/or close multiple locks.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

Figure 1:
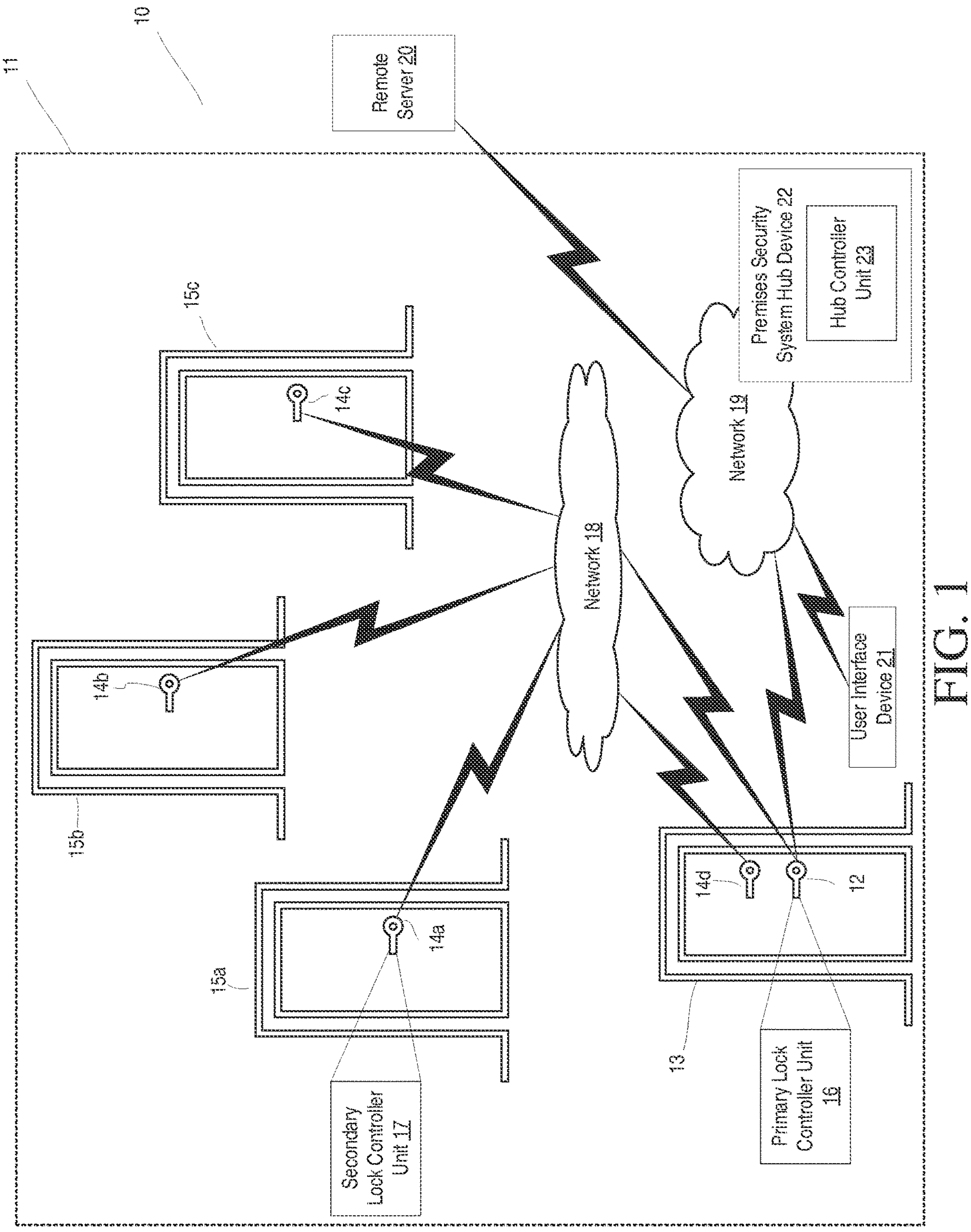
FIG. 1 is a diagram of an example system comprising a premises lock system according to principles of the present disclosure.

Embodiments of the present disclosure provide multi-locking mechanisms in premises security systems, including multiple lock devices affixed to one or more structures (e.g., doors, windows, etc.). At least one of the lock devices in the premises security system (e.g., a "primary lock device") may be connected to a premises security system hub device (and/or a user interface device, such as a control panel, control device, smartphone application, web browser application, etc.).

In some embodiments, a primary lock device may be wirelessly connected to one or more additional lock devices (e.g., "secondary lock devices"). In some embodiments, one or more of the secondary lock devices may lack an ability to connect (e.g., may lack a configuration and/or lack a hardware capability) to the premises security system hub device. Two or more of the lock devices may form a wireless mesh network. The term "primary lock device" as used herein may refer to a lock device, such as a lock device in a premises security system, which may have the capability and/or configuration for connecting to one or more other primary lock devices and/or one or more secondary lock devices (e.g., either directly or via a router, hub, another device, and/or network), and/or that may have the capability and/or configuration for communicatively connecting to a premises security system hub device (e.g., to a control panel in a premises security system, either directly or via a router, hub, and/or network), and/or the capability and/or configuration for communicatively connecting to a user interface device (e.g., to a smartphone, either directly or via a router, hub, and/or network), and/or that may have the capability and/or configuration to receive user input for configuring (e.g., locking and/or unlocking) the lock device, e.g., a keycard reader, a keypad, a fingerprint reader, etc.

The term "secondary lock device" as used herein may refer to a lock device, such as a lock device in a premises security system, which may have the capability and/or configuration for communicatively connecting to one or more primary lock devices and/or one or more other secondary lock devices (e.g., either directly or via a router, hub, and/or network, such as an ad-hoc and/or mesh network). In some embodiments, secondary lock devices may lack the capability and/or configuration for communicatively connecting to a premises security system hub device, and/or may lack the capability and/or configuration for connecting to a user interface device (e.g., to a smartphone, either directly or via a router, hub, and/or network), and/or may lack the capability and/or configuration to receive user input for configuring (e.g., locking and/or unlocking) the lock device, e.g., a keycard reader, a keypad, a fingerprint reader, etc. In some embodiments, a secondary lock device may not lack any of these configurations and/or capabilities, but may be considered a secondary lock device because, for example, the end user does not activate or use the configurations or capabilities in a particular installation. For example, a secondary lock device may be configured to receive and implement a lock configuration received from a primary lock device (e.g., via a wireless mesh network connection), but may also be configured to receive and implement a lock configuration received from a premises security device, smartphone, keycard input, etc.

Thus, some embodiments of the present disclosure may provide a first lock that serves as a primary lock. The primary lock may be configured to communicatively connect to a premises security system hub device, and/or the primary lock may be a premises security system hub device and/or other controller device. The primary lock may include a local user input hardware (e.g., an alphanumeric keyboard, a touchscreen with an on-keyboard, a voice activated password, a fingerprint sensor, an iris sensor, a facial recognition sensor, etc.) for receiving, e.g., entry codes, fingerprint scans, etc., for authenticating a user and for configuring (e.g., locking and/or unlocking) the lock. In some embodiments, the primary lock device may create its own sub-network (e.g., mesh network) using one or more available wireless technologies to push status changes, control messages, and/or lock configurations to one or more secondary lock devices, as well as for monitoring the status of the one or more secondary lock devices. Thus, embodiments of the present disclosure may enable a user to interact with a single lock (e.g., a primary door lock), which may in turn provide the functionality of dual or multiple locks, such as a deadbolt on the same structure as the primary lock device, or other lock devices located on other structures. In other words, in some embodiments, the secondary locks may be located on the same structure (e.g., door, window, cabinet, etc.) as the primary lock, and/or the primary lock may be located on a different structure than one or more of the secondary locks. Similarly, each of the secondary locks may be located on the same structure, or on different structures.

Embodiments of the present disclosure may facilitate reducing the size of lock devices, as only one lock device (e.g., a primary lock device) may require local user input hardware, and other lock devices in the sub-network (e.g., secondary lock devices) may not require any local user input hardware, or may have some user input hardware (e.g., a keycard reader) but not other user input hardware (e.g., a fingerprint reader). Further, in some embodiments, the primary lock device may include hardware for communicating according to both a first wireless protocol and/or radio access technology (e.g., Wi-Fi) and a second wireless protocol (e.g., ZigBee), while the secondary lock devices may only include hardware for communicating according to the second wireless protocol and/or radio access technology, thereby reducing the complexity and/or cost of the secondary locks as compared with existing locking devices.

Before describing in detail exemplary embodiments, it is noted that embodiments may reside in combinations of apparatus components and processing steps related to multi-lock mechanism configurations in a premises security system. Accordingly, components have been represented where appropriate by conventional symbols in the drawings, focusing on details that may facilitate understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections. Communicatively connected therefore refers to one device being wired and/or wirelessly connected to engage in communications with at least one other device.

The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring now to the drawing figures in which like reference designators refer to like elements there is shown in FIG. 1 a system designated generally as "10." System 10 may include premises security system 11 where premises security system 11 includes and/or is associated with at least one primary lock device 12, which is associated with (e.g., affixed to, integrated into, etc.) a primary lock structure 13 (e.g., a door, window, etc.), for locking and unlocking the primary lock structure 13. Premises security system 11 may include and/or be associated with one or more secondary lock devices 14*a* to 14*d* (collectively referred to as "secondary lock devices 14), each associated with (e.g., affixed to) the primary lock structure 13 or one or more additional structures 15*a*-15*c* (collectively referred to as "additional structures 15").

Primary lock device 12 may include a primary lock controller unit 16 for controlling one or more functionalities of the primary lock device 12, as described herein. Secondary lock device 14 may include a secondary lock controller unit 17 for controlling one or more functionalities of the primary lock device 14, as described herein.

Premises security system 11 may further include a network 18, which may be, e.g., an ad-hoc and/or mesh network, and which may be for enabling wireless communication among the primary lock device 12 and the secondary lock devices 14. Premises security system 11 may further include a network 19, which may be, e.g., a wireless local area network (WLAN), which may include one or more routers, hubs, etc., and which may enable one or more entities of system 10 to communicate with one another and/or with a remote server 20 (e.g., via a public internet connection). In some embodiment, networks 18 and 19 may be a single network. System 10 also includes remote server 20. Remote server 20 may include, e.g., a cloud-based server, which may provide one or more functionalities described herein, e.g., with respect to the monitoring, configuring, etc., the entities of premises security system 11.

System 10 may further include a user interface device 21, which may be a wired and/or wireless device that allows a user to communicate with primary lock device 12, e.g., via network 19. User interface device 21 may be a portable control keypad/interface, computer, mobile phone, tablet, premises security system control device and/or control panel, smart home hub device, etc., which allows a user to interface with primary lock device 12 and/or any other entity of system 10.

For example, the user interface device 21 may communicate with primary lock device 12 via proprietary wireless communication protocols, and/or may also use a standard wireless communication protocol, such as Wi-Fi. Other communication technologies can also be used, and the use of Wi-Fi is merely an example. Although FIG. 1 shows user interface device within premises security system 11, user interface device 21 may be a mobile device that is not always located at the same premises as primary lock device 12 and secondary lock devices 14.

Premises security system 11 may further include a premises security system hub device 22, which may be a wired and/or wireless device that provides one or more features in a premises security system 11. For example, premises security system hub device 22 may provide one or more of management functions, networking functions, monitoring functions, analysis functions, control functions such as power management, premises device management and alarm management and/or analysis, among other functions to premises security system 11. In particular, premises security system hub device 22 may manage one or more life safety and lifestyle features. Life safety features may correspond to security system functions and settings associated with premises conditions that may result in life threatening harm to a person, such as carbon monoxide detection and intrusion detection. Lifestyle features may correspond to security system functions and settings associated with video capturing devices and non-life-threatening conditions of the premises, such as lighting and thermostat functions.

Primary lock device 12 may include a hub controller unit 23 for controlling one or more functionalities of the premises security system hub device 22, as described herein.

For example, a premises security system hub device 22 may communicate with primary lock device 12 and/or with a user interface device 21 and/or with one or more secondary lock devices 14 and/or one or more other premises devices (not shown), such as surveillance cameras, security sensors, thermostats, fire safety sensors, etc., via Bluetooth, via a ZigBee based communication link, e.g., network based on Institute of Electrical and Electronics Engineers (IEEE) 802.15.4 protocols, and/or Z-wave based communication link, or over the premises' local area network, e.g., network-based on Institute of Electrical and Electronics Engineers (IEEE) 802.11 protocols, such as Wi-Fi, etc.

In some embodiments, the premises security system hub device 22 may not be configured for and/or may not be capable of communicating with one or more secondary lock devices 14. In some embodiments, the premises security system hub device 22 may be configured for and/or may be capable of communicating with one or more secondary lock devices 14, but may only do so in certain modes of operation. For example, in a first mode of operation, the premises security system hub device 22 communicates (e.g., transmits and/or receives lock configuration information, instructions, commands, status messages, etc.) with the primary lock device 12 and with one or more secondary lock devices 14, and in a second mode of operation (e.g., when premises security system hub device 22 detects a communication link failure and/or a connection attempt failure in attempting to communicate with one or more secondary lock devices 14, during a low power mode of operation, etc.), the premises security system hub device 22 communicates with the primary lock device 12, which in turn forwards and/or routes lock configuration information, status messages, etc., to and/or from the secondary lock devices 14, e.g., via one or more direct wireless connections between primary lock device 12 and the one or more secondary lock devices 14, and/or via one or more direct and/or indirect wireless connections, such as an ad-hoc and/or mesh network (e.g., ZigBee).

For example, primary lock device 12 may receive, from premises security system hub device 22, a lock configuration or instruction to engage a lock mechanism for all secondary lock devices 14 in Zone A of the premises security system 11. Primary lock device 12 may determine which secondary lock devices 14 it has a direct wireless connection to, e.g., secondary lock device 14*a*. Primary lock device 12 may then forward the lock configuration or instruction to secondary lock device 14*a*, and/or may process the lock configuration or instruction, generate a new or modified lock configuration or instruction, and transmit the new or modified lock configuration or instruction to the secondary lock device 14*a*. Secondary lock device 14*a* may be configured to determine which additional secondary lock devices 14 it has a wireless connection to, e.g., secondary lock device 14*b* and secondary lock device 14*c*. Secondary lock device 14*a* may then forward the lock configuration or instruction to secondary lock device 14*b* and/or secondary lock device 14*c*, and/or secondary lock device 14*a* may process the lock configuration or instruction, generate a new or modified lock configuration or instruction, and transmit the new or modified lock configuration or instruction to the secondary lock device 14*b* and/or secondary lock device 14*c*.

In some embodiments, the user interface device 21 and/or the premises security system hub device 22 may communicate with primary lock device 12 and/or the secondary lock device(s) 14 via proprietary wireless communication protocols and may also use Wi-Fi. Other communication technologies can also be used, and the use of Wi-Fi is merely an example.

In some embodiments, the user interface device 21 and the premises security system hub device 22 are the same device, e.g., a premises security system hub device 22 which includes a touchscreen display panel for interfacing with a user. In some embodiments, the user interface device 21 and the premises security system hub device 22 may be one or more devices, e.g., a network router, a premises security system control panel, a smartphone application, a remote and/or cloud-based server, etc., which provide one or more of the premises security system 11 control, monitoring, and networking functionalities described herein. In some embodiments, the primary lock device 12 may serve as the user interface device 21 and/or the premises security system hub device 22. In some embodiments, the premises security system hub device 22 and/or user interface device 21 (or another entity in system 10) transmits a lock configuration to the primary lock device 12 (and/or to one or more secondary lock devices 14). In some embodiments, the lock configuration may be configurable by a user and/or may be preconfigured during manufacture. The primary lock device 12 may be configured to store the lock configuration in memory and implement the lock configuration, such that, when primary lock device 12 receives a user input (e.g., via a fingerprint sensor on the primary lock device 12), the primary lock device 12 looks up the stored lock configuration, and determines whether to lock or unlock the primary lock device 12 in response to the user input, and may further determine which, if any, secondary lock devices 14 to unlock or lock in response to the user input. Thus, in some embodiments, the lock configuration received (e.g., from the premises security system hub device 22, interface device 21, and/or from another entity in system 10, and/or configured by a user, and/or preconfigured such as during manufacture) may cause the primary lock device 12 (and/or one or more secondary lock devices 14) to lock or unlock in response to receiving the configuration, and/or the lock configuration may cause the primary lock device 12 (and/or one or more secondary lock devices 14) to respond to user input (e.g., a fingerprint sensor input) according to the lock configuration.

Primary lock device 12 may communicate with network 18 via one or more communication links. In particular, the communications links may be wireless communication link, such as a mesh network, ZigBee network, etc. Network 18 provides communications among one or more of primary lock device(s) 12 and secondary lock device(s) 14. In some embodiments, premises security system hub device 22 and/or user interface device 21 may also be configured to connect to network 18, while in other embodiments, premises security system hub device 22 and/or user interface device 21 may not be configured for and/or may not be capable of connecting to network 18.

Primary lock device 12 may communicate with network 19 via one or more communication links. In particular, the communications links may be broadband communication links such as a wired cable modem or Ethernet communication link, and a digital cellular communication link, e.g., long term evolution (LTE) and/or 5G based link, among other broadband communication links. Broadband as used herein may refer to a communication link other than a plain old telephone service (POTS) line. An Ethernet communication link may be an IEEE 802.3 or 802.11 based communication link. Network 19 may be a wide area network, local area network, wireless local network and metropolitan area network, among other networks. Network 19 provides communications among one or more of primary lock device 12, remote server 20 and, premises security system hub device 22, user interface device 21, etc. In some embodiments, one or more secondary lock devices 14 may be configured to connect to network 19. In some embodiments, one or more secondary lock devices 14 may lack a configuration for and/or capability of connecting to network 19.

Figure 2:
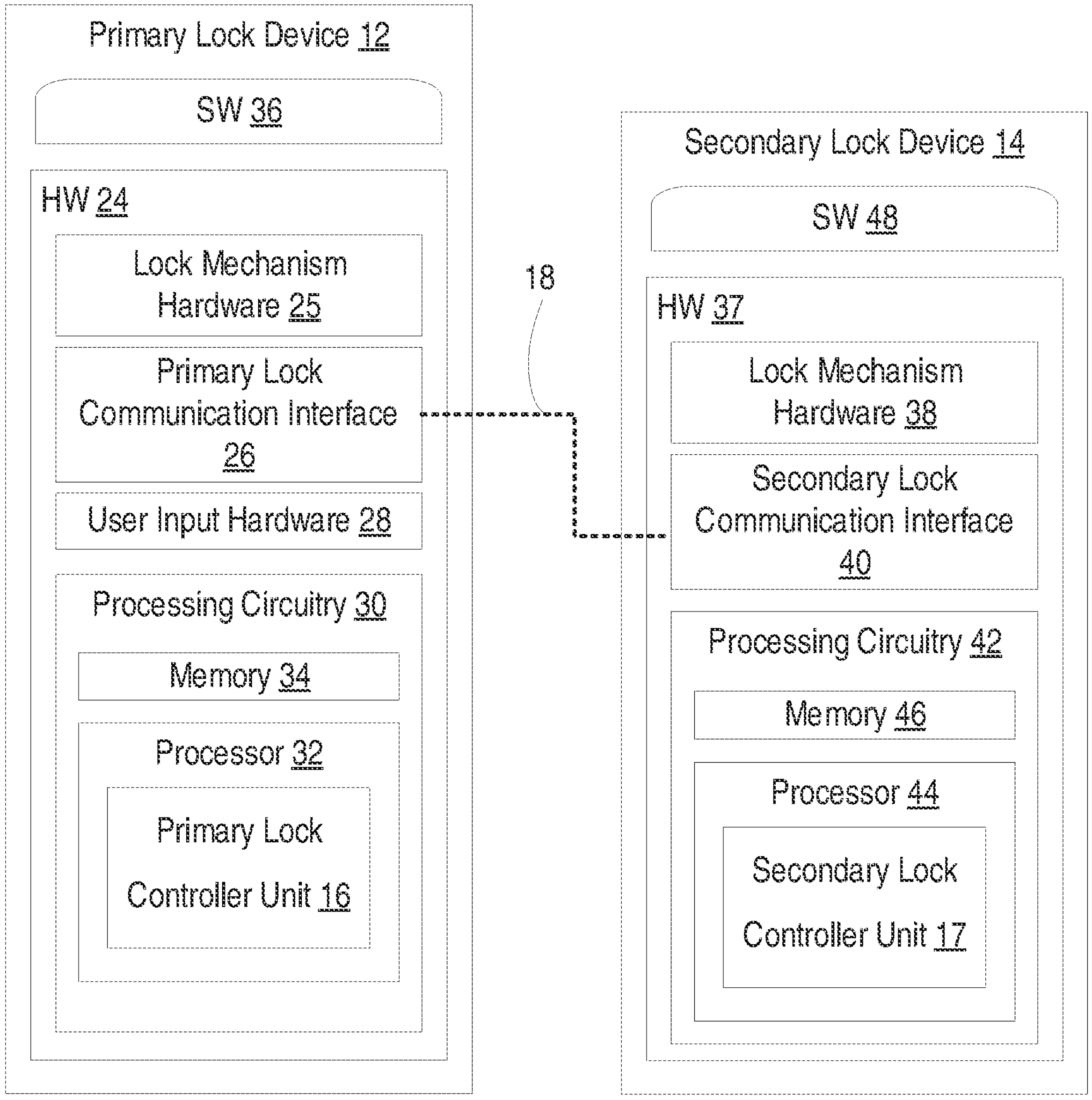
FIG. 2 is a block diagram of a primary lock device and a secondary lock device according to some embodiments of the present disclosure.

With respect to FIG. 2, the example system 10 includes a primary lock device 12 that includes hardware 24 enabling the primary lock device 12 to communicate with one or more entities in system 10 and to perform one or more functions described herein.

The hardware 24 may include lock mechanism hardware 25, which may be any lock mechanism hardware (e.g., a motor, actuator, bolt, cylinder, etc.) for engaging/locking or disengaging/unlocking structure 13.

The hardware 24 may include a primary lock communication interface 26 for setting up and maintaining at least a wired and/or wireless connection to one or more entities in system 10 such as remote server 20, secondary lock devices 14, user interface device 21, another primary lock device 12, etc.

The hardware 24 may include user input hardware 28, which may include, e.g., a keypad, keyboard, touchscreen display, a microphone, an image sensor, facial recognition sensor, fingerprint sensor, a keycard reader, a Radio-frequency identification (RFID) sensor, etc., which may be for receiving user input, such as a typed or verbal passcode for unlocking the door.

In the embodiment shown, the hardware 24 of the primary lock device 12 further includes processing circuitry 30. The processing circuitry 30 may include a processor 32 and a memory 34. In particular, in addition to or instead of a processor, such as a central processing unit, and memory, the processing circuitry 30 may comprise integrated circuitry for processing and/or control, e.g., one or more processors, processor cores, field programmable gate arrays (FPGAs), and/or application specific integrated circuits (ASICs) adapted to execute instructions. The processor 32 may be configured to access (e.g., write to and/or read from) the memory 34, which may comprise any kind of volatile and/or nonvolatile memory, e.g., cache and/or buffer memory, random access memory (RAM), read-only memory (ROM), optical memory, and/or erasable programmable read-only memory (EPROM).

Thus, the primary lock device 12 further has software 36 stored internally in, for example, memory 34, or stored in external memory (e.g., database, storage array, network storage device, etc.) accessible by the primary lock device 12 via an external connection. The software 36 may be executable by the processing circuitry 30. The processing circuitry 30 may be configured to control any of the methods and/or processes described herein and/or to cause such methods, and/or processes to be performed, e.g., by primary lock device 12. Processor 32 corresponds to one or more processors 32 for performing primary lock device 12 functions described herein. The memory 34 is configured to store data, programmatic software code and/or other information described herein. In some embodiments, the software 36 may include instructions that, when executed by the processor 32 and/or processing circuitry 30, cause the processor 32 and/or processing circuitry 30 to perform the processes described herein with respect to primary lock device 12. For example, processing circuitry 30 of the primary lock device 12 may include primary lock controller unit 16, which is configured to perform one or functions described herein such as with respect to supporting multi-lock configurations.

Referring still to FIG. 2, the example system 10 may further include secondary lock device 14 that includes hardware 37 enabling the secondary lock device 14 to communicate with one or more entities in system 10 and to perform one or more functions described herein.

The hardware 37 may include lock mechanism hardware 38, which may be any lock mechanism hardware (e.g., a motor, actuator, bolt, cylinder, etc.), for example, for locking or unlocking a structure to which the secondary lock is affixed (e.g., structure 13 or structure 15).

The hardware 37 may include a secondary lock communication interface 40 for setting up and maintaining at least a wired and/or wireless connection to one or more entities in system such as primary lock device 12, remote server 20, other secondary lock devices 14, user interface device 21, etc.

In some embodiments, the secondary lock communication interface 40 is limited to wireless communication. In some embodiments, the primary lock communication interface 26 is configured for and/or capable of communicating according to both a first radio access technology (RAT) and a second RAT, while the secondary lock communication interface 40 is configured for and/or capable of wireless communication only according to a second RAT. In some embodiments, the secondary lock communication interface 40 may lack capability for and/or is not configured to communicate according to the first RAT and may only be configured for and/or capable of communicating according to the second RAT. For example, the primary lock communication interface 26 may be configured to communicate (e.g., with user interface device 21, such as a premises security system panel or smart home hub) using Wi-Fi via network 19, and the primary lock communication interface 26 may be configured to communicate with secondary lock communication interface 40 via network 18 using a mesh network radio access technology and/or protocol, such as ZigBee.

In some embodiments, secondary lock device 14 does not include user input hardware (whereas primary lock device 12 does include user input hardware 28). Thus, in the example shown in FIG. 2, the user input hardware is omitted in the block diagram of secondary lock device 14 hardware 37. In some embodiments, the secondary lock device 14 hardware 37 may include one or more user input hardware (not shown), similar to the user input hardware 28. In some embodiments, secondary lock device 14 hardware 37 may include a first user input hardware that is a subset of and/or different from the user input hardware 28. For example, user input hardware 28 may include a keypad and a fingerprint sensor, whereas secondary lock device 14 user input hardware may include only a keypad. In another example, the secondary lock device 14 may include a first type of user input hardware (e.g., a keycard reader), whereas the primary lock device 14 may include a different type of user input hardware 28 (e.g., a facial recognition sensor).

In the embodiment shown, the hardware 24 of the second lock device 14 further includes processing circuitry 42. The processing circuitry 42 may include a processor 44 and a memory 46. In particular, in addition to or instead of a processor, such as a central processing unit, and memory, the processing circuitry 42 may comprise integrated circuitry for processing and/or control, e.g., one or more processors, processor cores, FPGAs, and/or ASICs adapted to execute instructions. The processor 44 may be configured to access (e.g., write to and/or read from) the memory 46, which may comprise any kind of volatile and/or nonvolatile memory, e.g., cache and/or buffer memory, RAM, ROM, optical memory, and/or EPROM.

Thus, the secondary lock device 14 further has software 48 stored internally in, for example, memory 46, or stored in external memory (e.g., database, storage array, network storage device, etc.) accessible by the secondary lock device 14 via an external connection. The software 48 may be executable by the processing circuitry 42. The processing circuitry 42 may be configured to control any of the methods and/or processes described herein and/or to cause such methods, and/or processes to be performed, e.g., by secondary lock device 14. Processor 44 corresponds to one or more processors 44 for performing secondary lock device 14 functions described herein. The memory 46 is configured to store data, programmatic software code and/or other information described herein. In some embodiments, the software 48 may include instructions that, when executed by the processor 44 and/or processing circuitry 42, cause the processor 44 and/or processing circuitry 42 to perform the processes described herein with respect to secondary lock device 14. For example, processing circuitry 42 of the secondary lock device 14 may include secondary lock controller unit 17, which is configured to perform one or functions described herein such as with respect to supporting multi-lock configurations.

Figure 3:
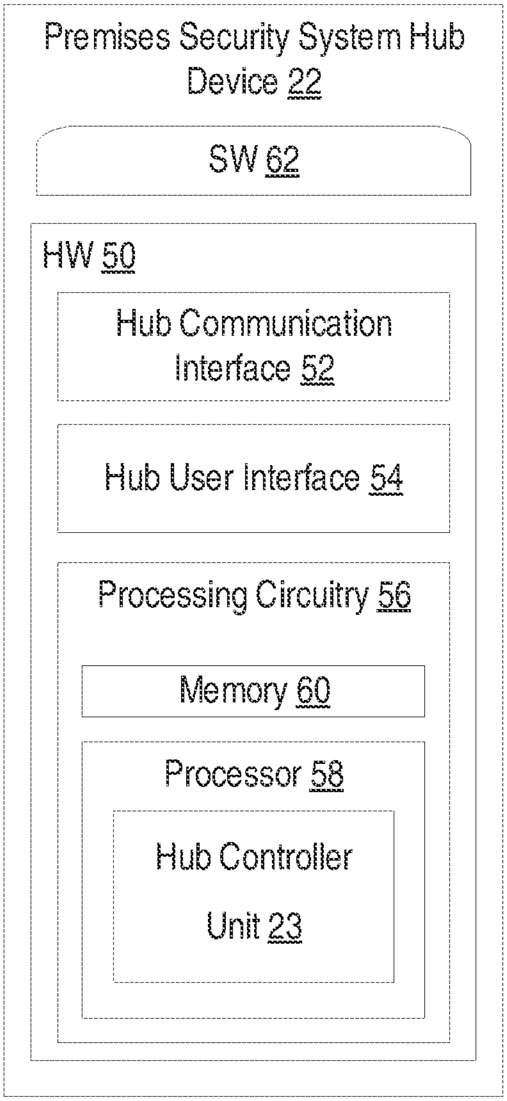
FIG. 3 is a block diagram of a premises security system hub device according to some embodiments of the present disclosure.

With respect to FIG. 3, the example system 10 may further include premises security system hub device 22 that includes hardware 50 enabling the premises security system hub device 22 to communicate with one or more entities in system 10 and to perform one or more functions described herein.

The hardware 50 may include a hub communication interface 52 for setting up and maintaining at least a wired and/or wireless connection to one or more entities in system 10 such as primary lock device 12, remote server 20, secondary lock devices 14, user interface devices 21, premises devices (e.g., surveillance cameras, thermostats, etc.), etc.

In some embodiments, hub communication interface 52 is limited to wireless communication. In some embodiments, the primary lock communication interface 26 is configured for and/or capable of communicating according to both a first radio access technology (RAT) and a second RAT, while the hub communication interface 52 is configured for and/or capable of wireless communication only according to the first RAT. In some embodiments, the hub communication interface 52 may lack capability for and/or is not configured to communicate according to the second RAT, and may only be configured for and/or capable of communicating according to the first RAT. For example, the hub communication interface 52 may be configured to communicate (e.g., with user interface device 21, with primary lock device 12, etc.) using Wi-Fi via network 19, but lacks and configuration for and/or capability for communicating with one or more secondary lock communication interfaces 40 via network 18 using a mesh network radio access technology and/or protocol, such as ZigBee.

In some embodiments, the hardware 50 further includes hub user interface 54, which may include, e.g., a touchscreen display, a keypad, a keyboard, and/or other user input hardware (e.g., fingerprint sensor, facial recognition sensor, etc.). For example, a hub user interface 54, such as a touchscreen display, may provide a user (e.g., installer, end user, etc.) with various configuration menus, settings, etc., for configuring the primary lock device(s) 12 and secondary lock device(s) 14 of the premises security system 11. For example, the user may, via the hub user interface 54, enroll, configure, assign, modify, update, etc., one or more primary lock devices 12 and secondary lock devices 14 in the premises security system 11.

In the embodiment shown, the hardware 50 of the second lock device 14 further includes processing circuitry 56. The processing circuitry 56 may include a processor 58 and a memory 60. In particular, in addition to or instead of a processor, such as a central processing unit, and memory, the processing circuitry 56 may comprise integrated circuitry for processing and/or control, e.g., one or more processors, processor cores, FPGAs, and/or ASICs adapted to execute instructions. The processor 58 may be configured to access (e.g., write to and/or read from) the memory 60, which may comprise any kind of volatile and/or nonvolatile memory, e.g., cache and/or buffer memory, RAM, ROM, optical memory, and/or EPROM.

Thus, the premises security system hub device 22 further has software 62 stored internally in, for example, memory 60, or stored in external memory (e.g., database, storage array, network storage device, etc.) accessible by the premises security system hub device 22 via an external connection. The software 62 may be executable by the processing circuitry 56. The processing circuitry 56 may be configured to control any of the methods and/or processes described herein and/or to cause such methods, and/or processes to be performed, e.g., by premises security system hub device 22. Processor 58 corresponds to one or more processors 58 for performing premises security system hub device 22 functions described herein. The memory 60 is configured to store data, programmatic software code and/or other information described herein. In some embodiments, the software 62 may include instructions that, when executed by the processor 58 and/or processing circuitry 56, cause the processor 58 and/or processing circuitry 56 to perform the processes described herein with respect to premises security system hub device 22. For example, processing circuitry 56 of the premises security system hub device 22 may include hub controller unit 23, which is configured to perform one or functions described herein such as with respect to supporting multi-lock configurations in a premises security system 11, e.g., determining a lock configuration for one or more primary lock devices 12 and secondary lock devices 14, as described herein.

Although FIGS. 1, 2, and 3 show primary lock controller unit 16, secondary lock controller unit 17, and hub controller unit 23 as being within a respective processor, these units may be implemented such that a portion of each unit is stored in a corresponding memory within the processing circuitry. In other words, the units may be implemented in hardware or in a combination of hardware and software within the processing circuitry.

Figure 4:
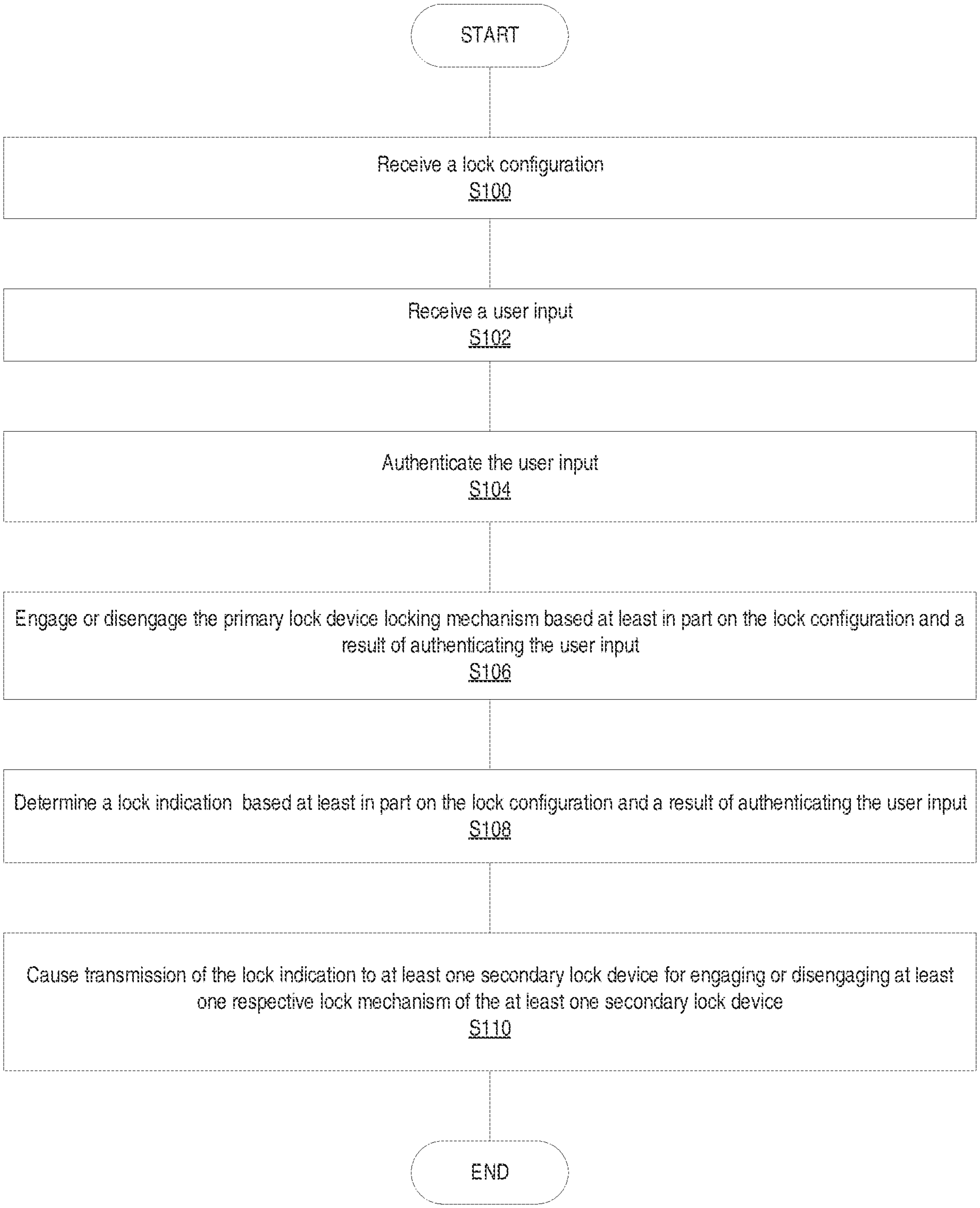
FIG. 4 is a flowchart of an example process implemented by a primary lock device according to some embodiments of the present disclosure.

FIG. 4 is a flowchart of an example process implemented by a primary lock device 12 according to one or more embodiments of the present disclosure. One or more blocks described herein may be performed by one or more elements of primary lock device 12 such as by one or more of lock mechanism hardware 25, primary lock communication interface 26, user input hardware 28, processing circuitry 30 (including the primary lock controller unit 16), processor 32, memory 34, etc. Primary lock device 12 may be configured to wirelessly communicate with a premises security system hub device 22 and at least one secondary lock device 14 in a premises security system 11. Primary lock device 12 is configured to receive (Block S100) a lock configuration (e.g., from the premises security system hub device 22, from another entity in system 10, configured or modified by a user via user input hardware 28, and/or preconfigured during manufacture, etc.), as described herein. Primary lock device 12 is configured to receive (Block S102) a user input, as described herein. In some embodiments, the user input may be received via user input hardware 28, and/or may be received from another entity in system 10, such as premises security system hub device 22 and/or user interface device 21. Primary lock device 12 is configured to authenticate (Block S104) the user input, as described herein. In some embodiments, authenticating the user input may include comparing the received user input with a reference user input, e.g., which may be stored in memory 34, indicated in the lock configuration, etc. In some embodiments, authenticating may include transmitting the received user input to another entity in system 10, e.g., premises security system hub device 22, user interface device 21, remote server 20, etc., which performs at least a portion of the authentication procedure, and returns an indication of a result of the authentication (e.g., whether it was successful or not). Primary lock device 12 is configured to engage or disengage (Block S106) the primary lock device 12 locking mechanism hardware 25 based at least in part on the lock configuration and a result of authenticating the user input, as described herein. Primary lock device 12 is configured to determine (Block S108) a lock indication based at least in part on the lock configuration and a result of authenticating the user input, as described herein. Primary lock device 12 is configured to cause transmission (Block S110) of the lock indication to at least one secondary lock device 14 for engaging or disengaging at least one respective lock mechanism of the at least one secondary lock device 14, as described herein.

According to one or more embodiments, the user input includes at least one of at least one keypad input received on a keypad of the primary lock device 12, at least one audio input recorded by a microphone of the primary lock device 12, at least one fingerprint input recorded by a fingerprint sensor of the primary lock device 12, and at least one face input recorded by a facial recognition sensor of the primary lock device 12.

According to one or more embodiments, the primary lock device 12 is further configured to determine at least one attribute of the user input, where the at least one attribute of the user input includes at least one of a user identity associated with the user input, a user permission level associated with the user input, a time of day associated with the user input, and an identity of the primary lock device associated with the user input, at least one keypad input pattern associated with the at least one keypad input, at least one modifier term associated with the at least one audio input, at least one finger associated with the at least one fingerprint input, and a facial expression associated with the face input, and determining the lock indication is further based at least in part on the at least one attribute of the user input. For example, in some embodiments, at a first time of day (e.g., morning), the lock indication is configured to cause secondary lock devices 14*a* and 14*b* to unlock (or remain unlocked if already unlocked), but may cause secondary lock device 14*c* to lock (or remain locked if already locked). In this example, at a second time of day (e.g., evening), the lock indication is configured to cause secondary lock devices 14*a*, 14*b*, and 14*c* to unlock (or remain unlocked if already unlocked). As another example, in some embodiments, when the user input corresponds to an index finger fingerprint of the user, the lock indication is configured to cause secondary lock devices 14*a* and 14*b* to unlock, and to cause secondary lock device 14*c* to lock. In this example, when the user input corresponds to a middle finger fingerprint of the user, the lock indication is configured to cause secondary lock devices 14*a*, 14*b*, and 14*c* to unlock. These are mere examples, and various different configurations, mappings, associations, etc., of user inputs and user input attributes to primary lock device(s) 12 and secondary lock device(s) 14 (and/or to groups of such lock devices) may be configured, e.g., by a user via a user interface device 21 and/or a premises security system hub device 22.

According to one or more embodiments, the primary lock device 12 provides a first locking mechanism for a first structure 13 in the premises, and the at least one secondary lock device 14 provides a second locking mechanism for one of the first structure 13, and a second structure 15 in the premises different from the first structure 13.

According to one or more embodiments, the lock configuration comprises a first lock group comprising at least one secondary lock device 14, and a second lock group comprising at least one secondary lock device 14 (e.g., one or more different secondary lock devices 14 which are not in the first lock group), and the lock indication is configured to engage the respective lock mechanism hardware 38 of each secondary lock device 14 of the first lock group, and disengage the respective lock mechanism hardware 38 of each secondary lock device 14 of the second lock group. According to one or more embodiments, the first lock group is associated with a first area in the premises (e.g., a bedroom, a basement, an office, a storage closet, a server room, etc.), and the second lock group is associated with a second area in the premises different from the first area. According to one or more embodiments, the first lock group is associated with a first user permission level and the second lock group is associated with a second user permission level different from the first user permission level.

According to one or more embodiments, causing transmission of the lock indication to at least one secondary lock device 14 for configuring the at least one secondary lock device 14 comprises causing transmission of the lock indication to a first secondary lock device 14, where the lock indication configures the first secondary lock device 14 to forward the lock indication to at least one additional secondary lock device 14. According to one or more embodiments, the user input is received from one of a user interface device 21 and the premises security system hub device 22 via a first radio access technology (RAT), and the forwarding of the lock indication to the at least one additional secondary lock device 14 is via a second RAT different from the first RAT. According to one or more embodiments, the lock configuration is received from the premises security system hub device 22 via a first radio access technology (RAT), and the forwarding of the lock indication to the at least one additional secondary lock device 14 is via a second RAT different from the first RAT.

In some embodiments, if the lock mechanism hardware 25 is already engaged, and the primary lock device 12 determines to engage the lock mechanism hardware 25 based on the configuration or the result of authenticating the user input, then there may be no change effected. Similarly, if the lock mechanism hardware 25 is already disengaged, and the primary lock device 12 determines to disengage the hardware based on the configuration or the result of authenticating the user input, then no change to the lock mechanism hardware 25 occurs.

Figure 5:
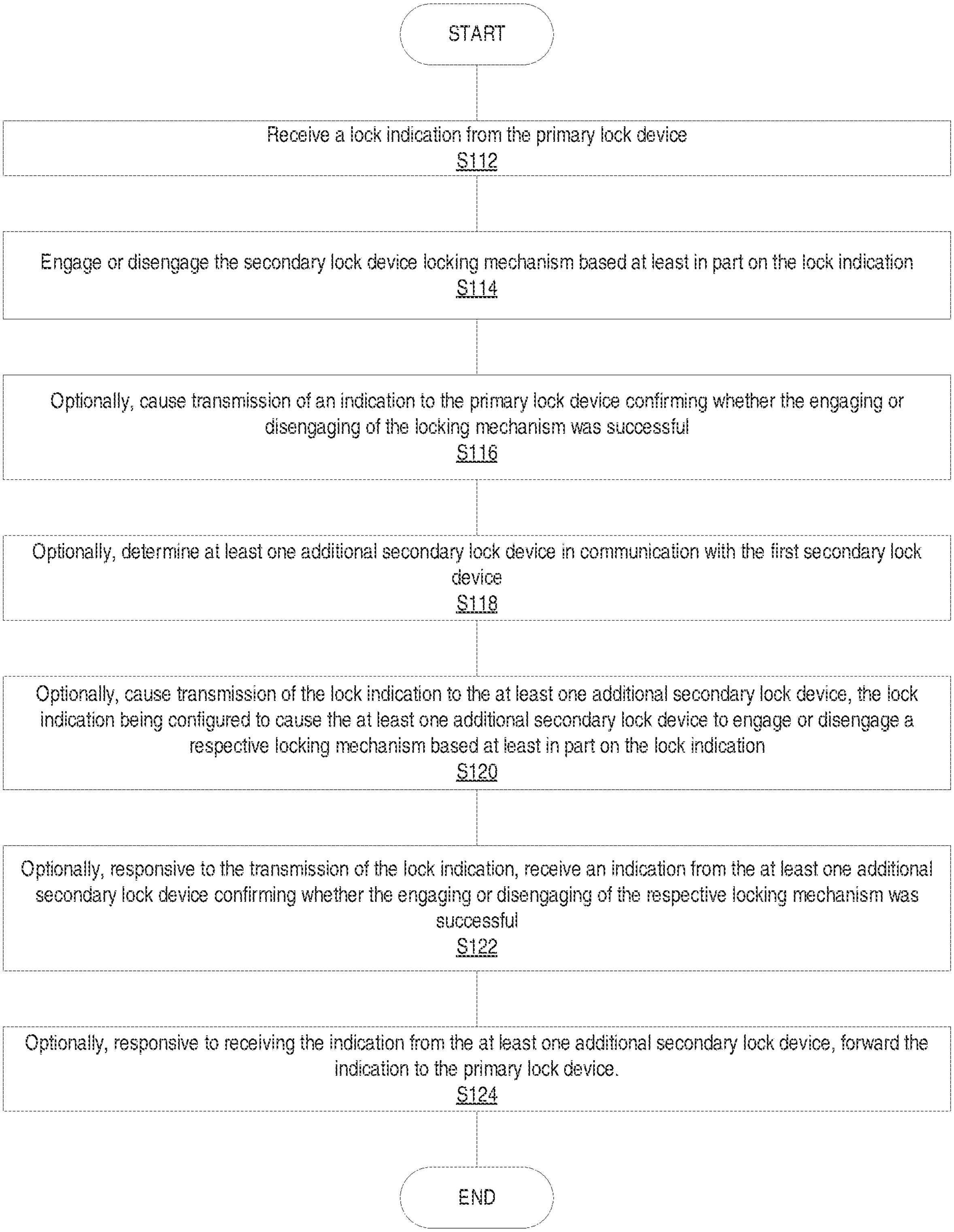
FIG. 5 is a flowchart of an example process implemented by a secondary lock device according to some embodiments of the present disclosure.

FIG. 5 is a flowchart of an example process implemented by a second lock device 14 according to one or more embodiments of the present disclosure. One or more blocks described herein may be performed by one or more elements of secondary lock device 14 such as by one or more of lock mechanism hardware 38, secondary lock communication interface 40, processing circuitry 42 (including the secondary lock controller unit 17), processor 44, memory 46, etc. Secondary lock device 14 may be configured to wirelessly communicate with a premises security system hub device 22, a primary lock device 12, and/or at least one secondary lock device 14 in a premises security system 11. Secondary lock device 14 is configured to receive (Block S112) a lock indication from the primary lock device, the lock indication being associated with a lock configuration received by the primary lock device 12 from a premises security system hub device 22, and optionally, being associated with at least one attribute of the a user input received at the primary lock device 12. Secondary lock device 14 is configured to engage or disengage (Block S114) the secondary lock device 14 lock mechanism hardware 38 based at least in part on the lock indication. For example, the lock indication may instruct the secondary lock device 14 to change to a locked or unlocked state. As another example, the lock indication may instruct the secondary lock device 14 to determine at least one other attribute of the secondary lock device 14 (e.g., information corresponding to a location, area, group, etc., of the secondary lock device, which may be stored in memory 46, for example), and the secondary lock device 14 (e.g., secondary lock controller unit 17) may determine whether to lock or unlock based at least in part on the lock indication and the at least one other attribute. For example, the lock instruction received from the primary lock device 12 may instruct "Unlock all locks of Group 1, lock all locks of Group 2", and the secondary lock device 14 may look up, in response to the instruction, information in its memory 46 to determine which lock group (or area, location, etc.) the secondary lock device 14 is part of and/or associated with, and may then determine whether to lock or unlock accordingly. In other embodiments, the primary lock device 12 may determine whether the secondary lock device 14 is part of Group 1 or Group 2 (e.g., based on the lock configuration, based on information stored in memory 34, etc.), and the primary device controller 12 instructs the secondary lock device 14 to lock or unlock accordingly, in which case the secondary lock controller 14 may not need to determine whether it is in Group 1 or Group 2 when implementing the lock instruction, since this information was already determined by the primary lock device 12.

In some embodiments, secondary lock device 14 is further configured to, optionally, cause transmission (Block S116) of an indication to the primary lock device 12 confirming whether the engaging or disengaging of the locking mechanism in response to the lock indication was successful. Secondary lock device 14 is further configured to, optionally, determine (Block S118) at least one additional secondary lock device 14 in communication with the first secondary lock device 14. For example, secondary lock device 14 may receive a configuration or other control information from primary lock device 12 (or another entity of system 10) which indicates a list of which additional secondary lock device(s) 14 the secondary lock device 14 should forward lock instructions to. In some embodiments, the list of additional secondary lock device(s) 14 should forward lock instructions to is included in the lock indication. In some embodiments, the list is associated with a group of locks and/or an area, location, and/or zone of the premises. In some embodiments, the secondary lock device 14 measures signal strength (e.g., using pilot signals, reference signals, beacon signals, etc.), and/or determines which additional secondary lock devices 14 are within wireless signal range, and forwards the lock instruction(s) to the additional secondary lock devices 14 which are expected to be able to successfully receive the wireless transmission from the secondary lock device 14. Secondary lock device 14 is further configured, optionally, to cause transmission (Block S120) of the lock indication to the at least one additional secondary lock device 14, where the lock indication is configured to cause the at least one additional secondary lock device to engage or disengage a respective locking mechanism based at least in part on the lock indication. Secondary lock device 14 is further configured, optionally, to receive (Block S122) an indication from the at least one additional secondary lock device 14 confirming whether the engaging or disengaging of the respective locking mechanism was successful, where the indication is received responsive to the transmission of the lock indication. Secondary lock device 14 is further configured to forward (Block S124) the indication to the primary lock device 12 responsive to receiving the indication from the at least one additional secondary lock device 14.

In some embodiments, secondary lock device 14 may be unlocked by a user (e.g., "manually unlocked") without requiring a lock indication to be wirelessly transmitted from a primary lock device 12. For example, secondary lock device 14 may include user input hardware (e.g., fingerprint reader, keycard reader, etc.) for receiving user input for unlocking the secondary lock device 14. In some embodiments, when a user manually unlocks a secondary lock device 14, the secondary lock device 14 is configured to transmit an indication to the primary lock device 12 (which may forward the indication to the premises security system hub device 22, remote server 20, etc.), indicating that the secondary lock device 14 was manually unlocked, indicating attributes of the manual unlocking (e.g., timestamp, which user credentials were used to unlock it, etc.). This information may be used for further configuration, refinement, and/or training of the premises security system 11, as described herein.

Figure 6:
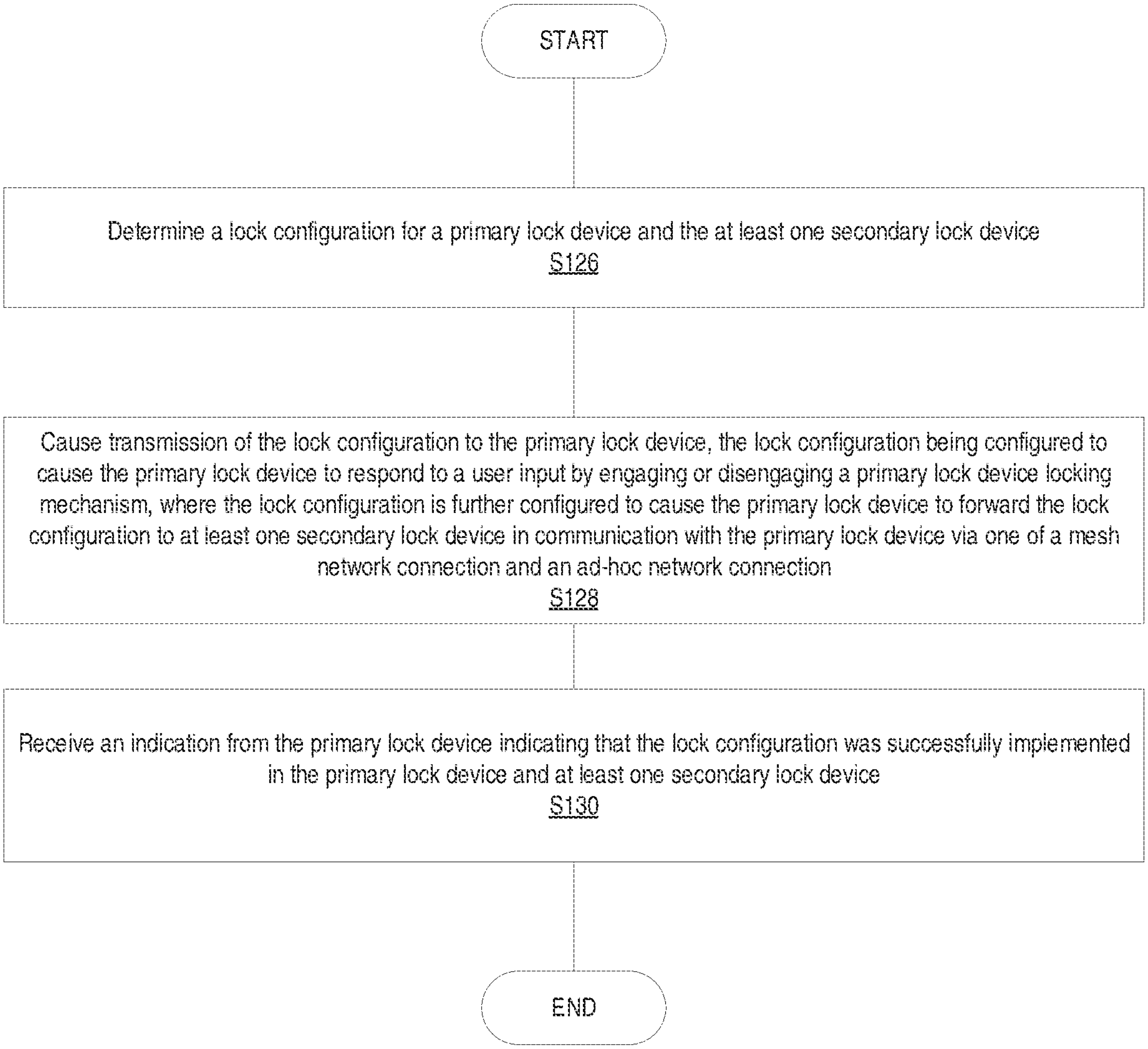
FIG. 6 is a flowchart of an example process implemented by a premises security system hub device according to some embodiments of the present disclosure.

FIG. 6 is a flowchart of an example process implemented by a premises security system hub device 22 according to one or more embodiments of the present disclosure. One or more blocks described herein may be performed by one or more elements of premises security system hub device 22 such as by one or more of hub communication interface 52, hub user interface 54, processing circuitry 56 (including the hub controller unit 23), processor 58, memory 60, etc. Premises security system hub device 22 may be configured to wirelessly communicate with a primary lock device 12, a user interface device 21, a remote server 20, and optionally, with one or more secondary lock devices 14, in a premises security system 11. Premises security system hub device 22 is configured to determine a lock configuration for a primary lock device 12 and the at least one secondary lock device 14. For example, the lock configuration may be determined based on one or more user settings, which may be input via the hub user interface 54, for example, and/or which may be preconfigured in memory 60, and/or which may be received from remote server 20, and/or which may be received from user interface device 21. Premises security system hub device 22 is configured to cause transmission (Block S128) of the lock configuration to the primary lock device 12, where the lock configuration is configured to cause the primary lock device 12 to respond to a user input (e.g., a keypad entry, fingerprint scan, etc.)

by engaging or disengaging a primary lock device lock mechanism hardware 25. The lock configuration is further configured to cause the primary lock device 12 to forward the lock configuration to at least one secondary lock device 14 in communication with the primary lock device 12 via one of a mesh network connection and an ad-hoc network connection (e.g., network 18). Premises security system hub device 22 is configured to receive (Block S130) an indication from the primary lock device 12 indicating that the lock configuration was successfully implemented in the primary lock device 12 and at least one secondary lock device 14.

In some embodiments, the premises security system hub device 22 (e.g., hub controller unit 23) may be configured to perform a machine learning procedure to determine the lock configuration. For example, in a first phase (training phase), the premises security system hub device 22 monitors which primary lock device(s) 12 and which secondary lock device (s) 14 are unlocked (e.g., manually unlocked) by a user A when user A enters the premises. For example, user A may typically unlock a primary lock device 12 and shortly thereafter, unlocks (e.g., manually unlocks) a secondary lock device 14, e.g., a deadbolt attached to the same structure 13 as primary lock device 12. The secondary lock device 14 transmits an indication to the primary lock device 12 indicating the manual unlocking which the primary lock device 12 forwards to the premises security system hub device 22. The premises security system hub device 22 records (e.g., in memory 60) the instance of the secondary lock device(s) 14 being unlocked shortly after the primary lock device 12 (e.g., implying that these two or more locks are associated or paired). The time difference may be a preconfigured threshold, e.g., any secondary lock device 14 which is unlocked within 10 minutes of the primary lock device 12 results in a record of the two being paired, whereas if the time difference is greater than the threshold, then the two locks are not considered paired, and there is no recording made. The premises security system hub device 22 may train a machine learning mode (e.g., stored in memory 60) based on these recorded instances of secondary lock device(s) 14 being manually unlocked after the primary lock device(s) 12, such that the machine learning model learns which secondary lock devices 14 should be unlocked when primary lock device 12 is unlocked (e.g., based on timing information, based on which user(s) perform the unlocking, based on location within the premises, etc.). The machine learning model is then used to determine the lock configuration, which is sent to the primary lock device 12.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. All embodiments can be combined in any way and/or combination.

The present disclosure is not limited to what has been explicitly shown and described herein above. In addition, unless mention was made above to the contrary, all of the accompanying drawings are not to scale. A variety of modifications and variations are possible in light of the above teachings without departing from the scope and spirit of the present disclosure.

What is claimed is:

1. A lock device, comprising:
- a door lock mechanism; and
- processing circuitry configured to:
  - receive a user input;
  - authenticate the user input;
  - in response the user input being authenticated, at least:
    - cause the door lock mechanism to transition to a different state; and
    - cause transmission of a lock indication to another lock device to cause an additional door lock mechanism of the other lock device to transition to the different state.

2. The lock device of claim 1, wherein the different state is an unlocked state.

3. The lock device of claim 1, wherein the different state is a locked state.

4. The lock device of claim 1, wherein the user input comprises at least one of:
- a keypad input received on a keypad of the lock device;
- an audio input recorded by a microphone of the lock device;
- a fingerprint input obtained by a fingerprint sensor of the lock device; or
- a face input obtained by a facial recognition sensor of the lock device.

5. The lock device of claim 4, wherein:
- the processing circuitry is further configured to:
  - determine an attribute of the user input, the attribute of the user input comprising at least one of:
    - a user identity associated with the user input;
    - a user permission level associated with the user input;
    - a time of day associated with the user input;
    - an identity of the lock device associated with the user input;
    - a keypad input pattern associated with the keypad input;
    - a modifier term associated with the audio input;
    - a finger associated with the fingerprint input; and
    - a facial expression associated with the face input; and
  - determine a lock indication based at least in part on the attribute of the user input.

6. The lock device of claim 1, wherein the lock device is configured to lock and unlock a first structure in a premises, and the other lock device is configured to lock and unlock one of:
- the first structure; or
- a second structure in the premises different from the first structure.

7. The lock device of claim 1, wherein the processing circuitry is further configured to receive a lock configuration for a plurality of lock devices that comprise a first lock group and a second lock group.

8. The lock device of claim 7, wherein the first lock group is associated with a first area in a premises and the second lock group is associated with a second area in the premises different from the first area.

9. The lock device of claim 7, wherein the first lock group is associated with a first user permission level and the second lock group is associated with a second user permission level different from the first user permission level.

10. The lock device of claim 1, wherein the processing circuitry is further configured to:
- cause the lock indication to be forwarded by the other lock device to another device.

11. The lock device of claim 1, wherein the processing circuitry is further configured to:
- receive the user input via a first radio access technology (RAT); and
- cause the lock indication to be forwarded by the other lock device to the other device via a second RAT different from the first RAT.

12. A method implemented by a lock device, the lock device comprising a door lock mechanism, the method comprising:
- receiving a user input;
- authenticating the user input;
- in response the user input being authenticated, at least:
  - causing the door lock mechanism to transition to a different state; and
  - causing transmission of a lock indication to another lock device to cause an additional door lock mechanism of the other lock device to transition to the different state.

13. The method of claim 12, wherein the different state is an unlocked state.

14. The method of claim 12, wherein the different state is a locked state.

15. The method of claim 12, wherein the user input comprises at least one of:
- a keypad input received on a keypad of the lock device;
- an audio input recorded by a microphone of the lock device;
- a fingerprint input obtained by a fingerprint sensor of the lock device; or a face input obtained by a facial recognition sensor of the lock device.

16. The method of claim 15, further comprising:

determining an attribute of the user input, the attribute of the user input comprising at least one of:

a user identity associated with the user input;

a user permission level associated with the user input;

a time of day associated with the user input;

an identity of the lock device associated with the user input;

a keypad input pattern associated with the keypad input;

a modifier term associated with the audio input;

a finger associated with the fingerprint input; and a facial expression associated with the face input; and determining a lock indication based at least in part on the attribute of the user input.

17. The method of claim 12, wherein the lock device is configured to lock and unlock a first structure in a premises, and the other lock device is configured to lock and unlock one of:

the first structure; or a second structure in the premises different from the first structure.

18. The method of claim 12, further comprising receiving a lock configuration for a plurality of lock devices that comprise a first lock group and a second lock group.

19. The method of claim 18, wherein the first lock group is associated with at least one of:

a first area in a premises and the second lock group is associated with a second area in the premises different from the first area; or a first user permission level and the second lock group is associated with a second user permission level different from the first user permission level.

20. The method of claim 12, further comprising:

receiving the user input via a first radio access technology (RAT); and causing the lock indication to be forwarded by the other lock device to the other device via a second RAT different from the first RAT.

* * * * *